United States Patent [19]

Bessouat et al.

[11] 4,278,053

[45] Jul. 14, 1981

[54] APPARATUS FOR DISTRIBUTION OF A MIXTURE OF VAPOR AND LIQUID IN A SEPARATOR WITH HORIZONTAL AXIS

[75] Inventors: Roger Bessouat; Jacques Marjollet, both of Paris; Gérard Palacio, Montmorency, all of France

[73] Assignee: Stein Industrie S.A., Velizy-Villacoublay, France

[21] Appl. No.: 96,264

[22] Filed: Nov. 21, 1979

[30] Foreign Application Priority Data

Nov. 24, 1978 [FR] France .................................. 78 33183

[51] Int. Cl.³ .......................... F16T 1/00; F22B 37/26
[52] U.S. Cl. ........................................ 122/488; 55/463
[58] Field of Search ............... 122/488, 489, 490, 491, 122/492; 55/462, 463, 466

[56] References Cited

U.S. PATENT DOCUMENTS

| 1,604,418 | 10/1926 | Oliphant | 55/463 |
| 3,393,496 | 7/1968 | Worley et al. | 122/488 X |
| 3,750,371 | 8/1973 | Gutman | 122/488 X |
| 4,014,671 | 3/1977 | Andro et al. | 55/463 X |
| 4,016,835 | 4/1977 | Yardem et al. | 122/483 |

Primary Examiner—Edward G. Favors
Attorney, Agent, or Firm—Sughrue, Rothwell, Mion, Zinn and Macpeak

[57] ABSTRACT

Apparatus for distribution and preliminary separation of a vapor-liquid mixture in a separator with horizontal axis, from a neck 10 on the lower generatrix of the separator, it comprising two symmetrical deflectors 11, 12 in the form of portions of cylinders, with parallel axes perpendicular to that of the separator, each cut by two oblique planes, and completed by three partitions 17, 18. Their edges are provided with troughs 21 for collecting and discharging the water deposited on their concave surface, issuing into spaces separated from the neck. The invention has application to separator-superheaters for wet water vapor from an expansion turbine.

5 Claims, 4 Drawing Figures

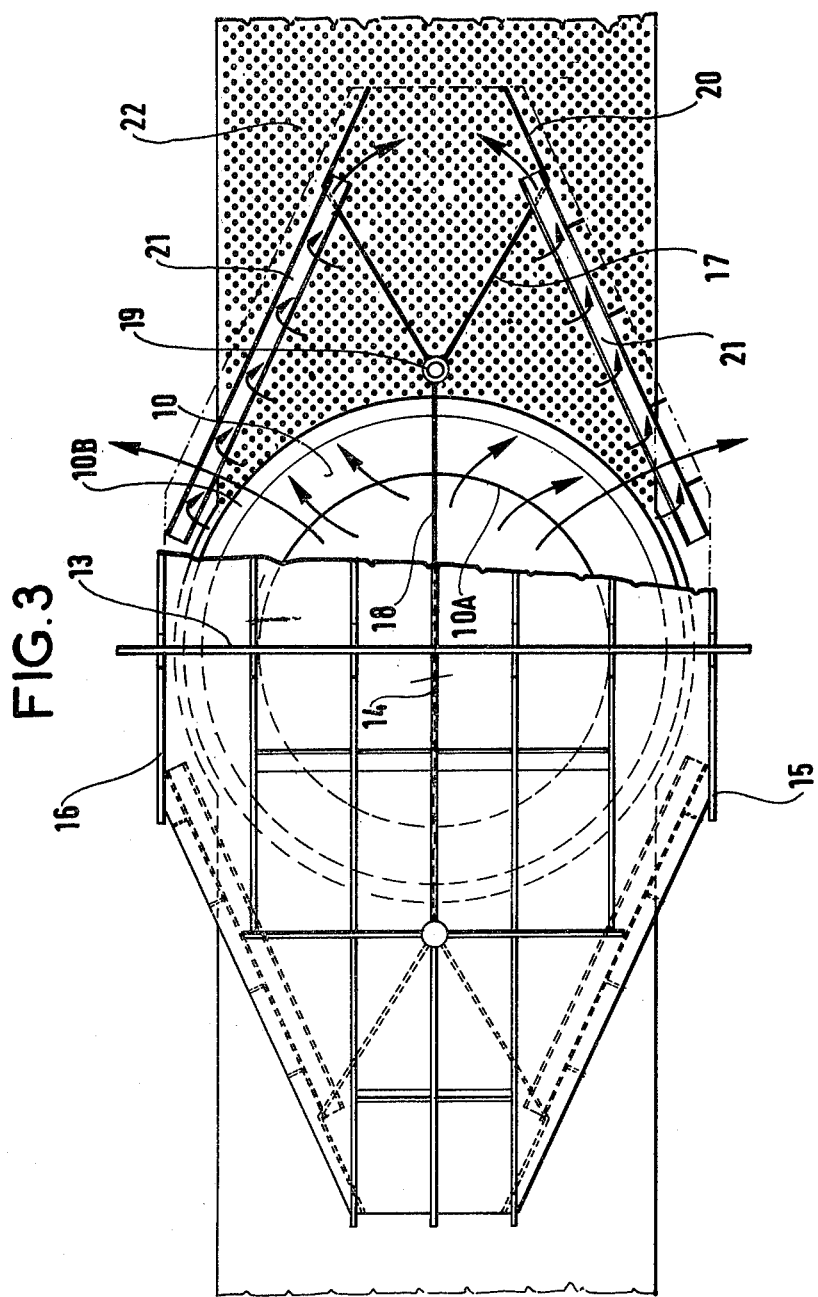

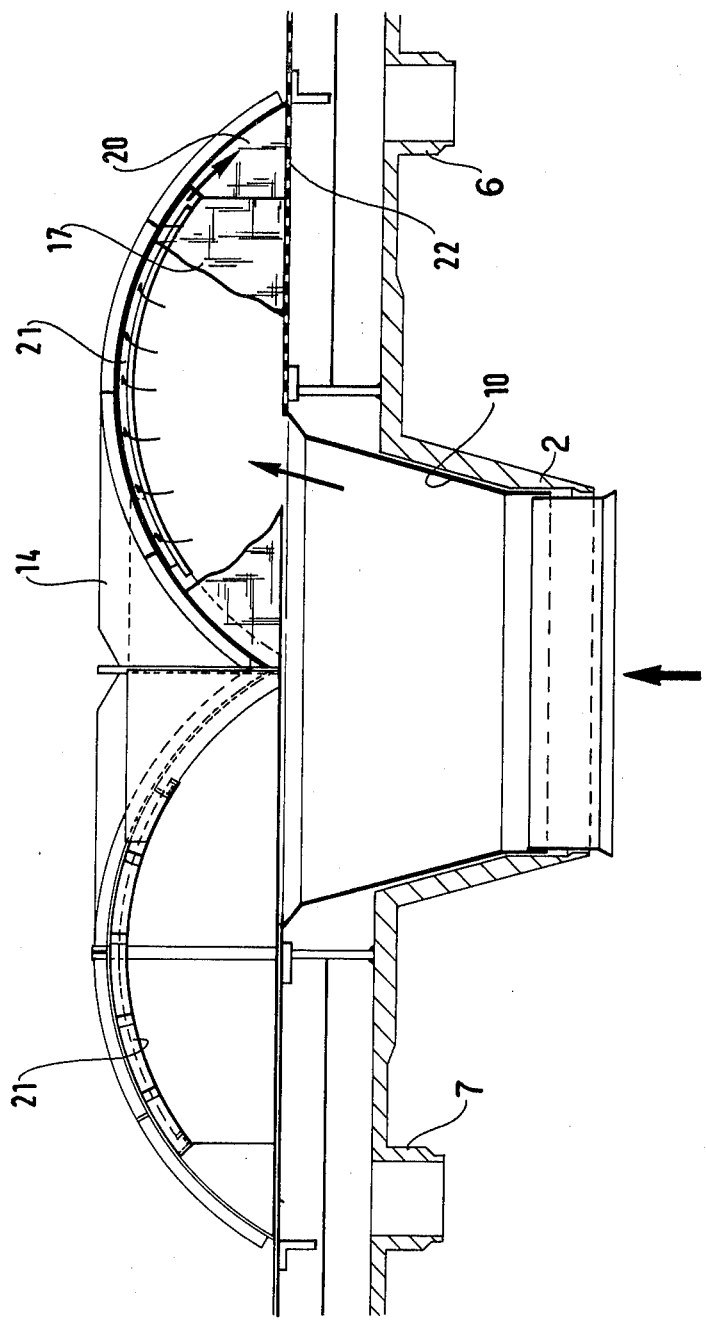

APPARATUS FOR DISTRIBUTION OF A MIXTURE OF VAPOR AND LIQUID IN A SEPARATOR WITH HORIZONTAL AXIS

FIELD OF THE INVENTION

The present invention concerns an apparatus for distribution and preliminary separation of a mixture of liquid and vapour in a separator with horizontal axis, from a neck disposed close to the lower generatrix of this separator.

BACKGROUND OF THE INVENTION

The mixtures of vapour and liquid introduced into separators, especially those of steam and water arising from high pressure expansion turbines in electrical power stations, are not very homogeneous, part of the water being capable of coming together in large drops which remain entrained by the steam. This water deposits itself at the entrance to some separator elements and clogs them temporarily, so that instabilities of flow occur.

Moreover, the flow of vapour-liquid mixture is never completely uniform over the cross-section of the supply tubing, so that preferential flows of the vapour-liquid mixture easily become established through one part of the separator elements, which impedes the operation of all these to the same fraction of their maximal capacity and reduces the overall flow which can be dealt with.

Preferred embodiments of the present invention remedy the above drawbacks and provide an apparatus for distribution of a vapour-liquid mixture in a separator which stops the large drops or bursts of liquid entrained by the vapour, which ensures a preliminary separation of the liquid and which allows the separator to be operated in a uniform manner and if necessary at a maximal flow greater than the flow which can be achieved without it.

SUMMARY OF THE INVENTION

The present invention provides apparatus for distribution and preliminary separation of a mixture of vapour and liquid in a separator with horizontal axis, from a neck disposed close to the lower generatrix of the separator, the apparatus comprising two deflectors in the general shape of portions of cylinders, with axes parallel to one another and perpendicular to that of the separator, the deflectors being symmetrical with respect to the vertical plane of symmetry of the said neck perpendicular to the axis of the separator, in which plane of symmetry they have a common generatrix, each deflector being cut by two planes oblique with respect to the longitudinal plane of symmetry of the separator, the projections of the oblique planes in the plane of the entry circle of the said neck in the separator lying outside the said entry circle, the deflectors being completed by three partitions, one in the plane of longitudinal symmetry of the separator and extending from the said common generatrix to the exterior of the said entry circle, and the other two being symmetrical with respect to the first and cutting it along a straight line parallel to the axis of the said neck, but outside the latter, the edges of the said deflectors being provided with troughs for collecting and discharging the liquid deposited on their concave surface, and issuing into the volume comprised between the said other two partitions, into which the mixture of vapour and liquid is unable to penetrate.

Furthermore, it preferably includes at least one of the following features:

The shape of the surface of the deflectors is such that, taking into account the flow rate of the mixture of vapour and liquid and the liquid content of this mixture, the liquid deposited on the surface of the deflectors cannot fall by gravity before it arrives in the collecting and discharging troughs.

The straight line common to the three partitions cuts the surface of a deflector at its highest generatrix.

The angle of the oblique planes delimiting the edges of a deflector with respect to the longitudinal plane of symmetry of the separator is about 25°.

The introducing neck is frusto-conical, and has a half-angle at the apex in the region of 15°.

An apparatus according to the invention is described hereinafter, by way of example and with reference to the figures of the accompanying drawings.

BRIEF DESCRIPTION OF THE DRAWINGS

FIG. 3 represents the same apparatus in plan, and is partially broken away; and

FIG. 4 is a vertical sectional view which represents the same apparatus with the right-hand part thereof partially broken away.

DESCRIPTION OF THE PREFERRED EMBODIMENT

Figure 1:
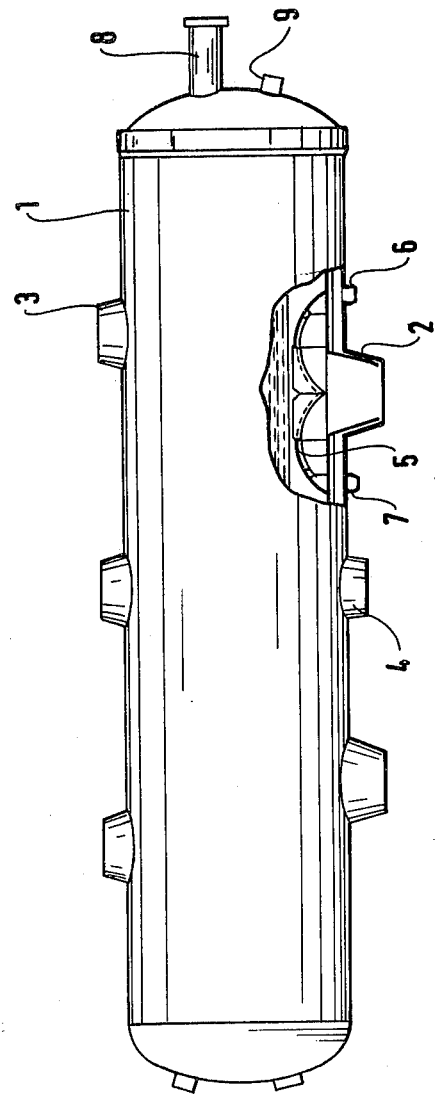
FIG. 1 is a general vertical view of the whole of a separator-superheater for wet steam from an expansion turbine, partially broken away to show an apparatus for introducing the wet steam to be dried and superheated.

In FIG. 1, the separator-superheater comprises an outer sleeve 1, with necks 2 for introducing the wet steam and necks 3 for discharging the superheated steam. As usual, the separator elements are in its lower part, and the superheater banks in its upper part. A neck 4 for the water retained by the separator elements is disposed in the middle of the sleeve while small necks 6, 7 allow discharge of the water initially separated in the apparatuses for introduction of the wet steam. An inlet neck 8 for the superheat steam at high pressure and an outlet neck 9 for the condensation water arising from this steam are disposed in the right-hand end of the sleeve.

Figure 2:
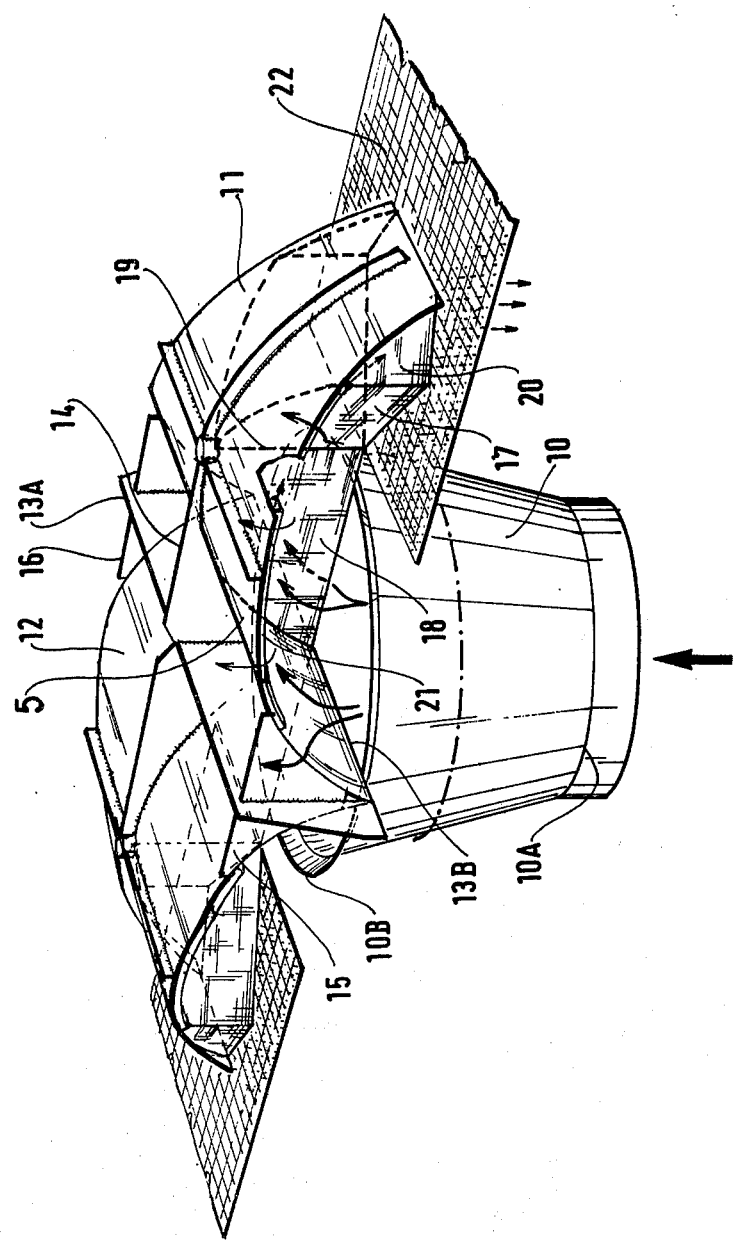
FIG. 2 represents, in perspective, the apparatus for introducing the wet steam.

In FIGS. 2 to 4, the apparatus for introducing the wet steam and for preliminary separation of water is positioned above a neck 10, within sleeve neck 2, for introducing the wet steam (circle 10A representing the aperture of the sleeve itself and 10B the upper edge of the neck). This neck is frusto-conical with 15° half-angle at the apex.

The apparatus consists of two cylindrical deflectors 11 and 12, symmetrical one to the other with respect to the plane of symmetry of the neck perpendicular to the longitudinal axis of the separator-superheater. The cylindrical plate 11 at the right of the figure is delimited on the one hand by the horizontal plane of the edge 10B of the neck, the axis of this plate being below this horizontal plane, and on the other hand by two vertical planes which are oblique with respect to the longitudinal plane of symmetry of the separator-superheater, and form, for example, an angle of 25° with this last. The assembly of the deflectors 11 and 12 is reinforced by plane plates 13A perpendicular to the axis of symmetry of the separator-superheater and plane plates 14, 15, 16 parallel to this same axis. The two deflectors intersect along the generatrix 13B.

Partitions such as 17 also cut the median partition 18 along the vertical segment 19, so limiting the volume into which the wet steam is able to flow. Finally, partitions such as 20 in the oblique vertical planes delimiting the plates 11 and 12, have a plenum volume between them into which is able to flow the water separated from the wet steam by depositing itself on the lower surface of the plates 11 and 12, running then into collecting troughs such as 21, of U-shaped cross-section, whose inner leg is much shorter than its outer leg, this latter being welded to the plate, as can be seen from the partial breaking away. The water which flows into the spaces delimited by the plates 17, as well as by the lower surface of the plate 11, is able to fall through the perforated plate 22 into conduits for collecting the separated water which convey it to the discharge necks 6, 7, FIG. 4.

This introducing apparatus works as follows. The wet steam arriving through the neck 10, loaded with large drops of water, comes into contact with the lower face of the plates 11 and 12. The large drops of water are deposited on the latter and are driven by the steam towards the troughs 21, while the wet steam follows the outline of the edge of the plates 11 and 12 and exits upwards in the separator-superheater. The angle made with the vertical by the plane tangential to the plates 11 and 12 at all points is such that, taking into account the speed of the wet steam the water deposited on the plates cannot fall into the neck 10 by gravity.

In the troughs 21, the water flows downwards on both sides and issues at each side outside the vertical cylinder which stands on the circle 10B. It consequently cannot fall back into the neck 10 and be entrained again by the wet steam. In particular, the water which flows in the trough 21 towards the partition 20 crosses the latter and flows downwards into the space delimited by the partitions such as 17 and 20, through the perforated plate 22, and is then discharged by the necks 6, 7.

The invention applies primarily to separation-superheaters for wet steam from an expansion turbine in an electrical power station, but can also be applied in all instances in which it is advisable to effect a preliminary separation of liquid from a mixture of vapour and liquid, especially when a part of the liquid is in the form of large drops.

We claim:

1. Apparatus for distribution and preliminary separation of a mixture of vapour and liquid in a sleeve separator having a horizontal axis, from a tubular neck disposed close to the lower generatrix of the separator sleeve, said apparatus comprising two deflectors in the general shape of portions of cylinders, with axes parallel to one another and perpendicular to that of the separator, said deflectors being symmetrical with respect to the vertical plane of symmetry of said neck perpendicular to the axis of said separator, in which plane of symmetry they have a common generatrix, each deflector being cut by two planes oblique with respect to the longitudinal plane of symmetry of said separator, the projections of the oblique planes in the plane of the entry circle of said neck in the separator lying outside said entry circle, said deflectors being completed by three partitions, one in the plane of longitudinal symmetry of the separator and extending from said common generatrix to the exterior of said entry circle, and the other two being symmetrical with respect to the first and cutting it along a straight line parallel to the axis of said neck, but outside the latter, the edges of said deflectors being provided with troughs for collecting and discharging the liquid deposited on their concave surface, and said troughs issuing into the volume comprised between said other two partitions, into which the mixture of vapour and liquid is unable to penetrate.

2. Apparatus according to claim 1, wherein the shape of the surface of the deflectors is such that, taking into account the flow rate of the mixture of vapour and liquid and the liquid content thereof, the liquid deposited on the surface of the deflectors is not able to fall by gravity before arriving in the collecting and discharging troughs.

3. Apparatus according to claim 1, wherein the straight line common to the three partitions cuts the surface of the deflector at its highest generatrix.

4. Apparatus according to claim 1, wherein the angle of the oblique planes delimiting the edges of the deflectors, with respect to the longitudinal plane of symmetry of the separator, is about 25°.

5. Apparatus according to claim 1, wherein the tubular introducing neck is frusto-conical, and has a half-angle at the apex of in the region of 15°.

* * * * *